T. R. TIMBY.
Solar Time Piece.
No. 40,519.
Patented Nov. 3, 1863.
Fig. 1.
Fig. 2.
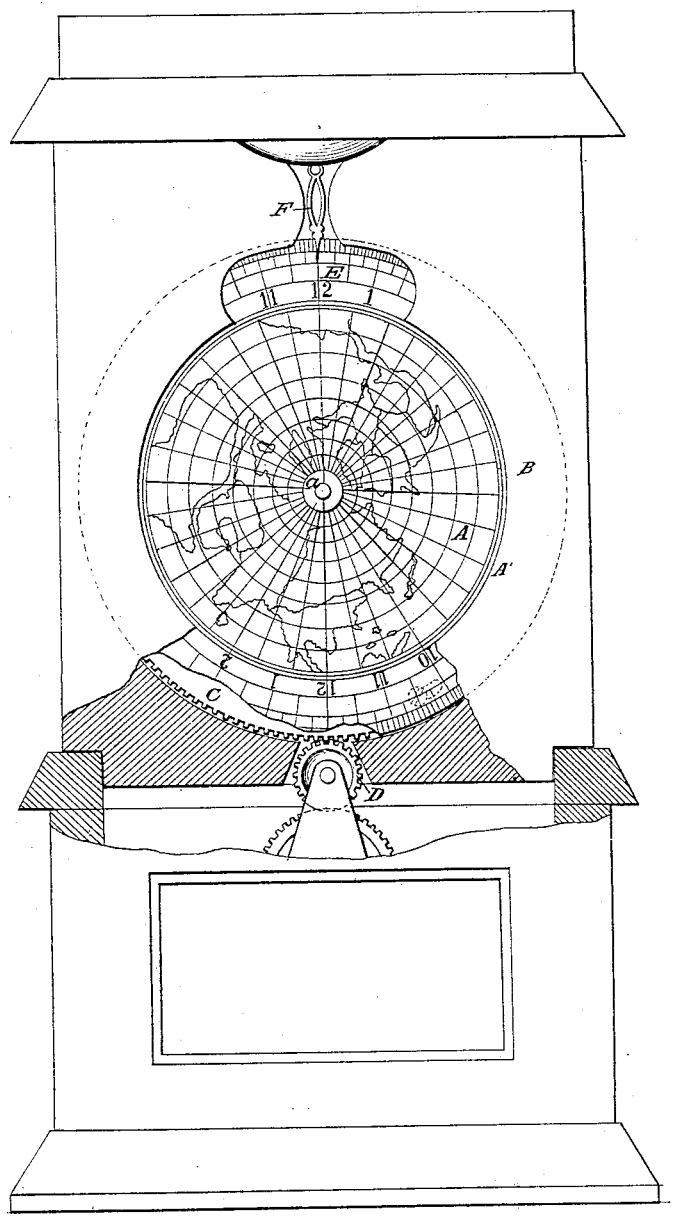
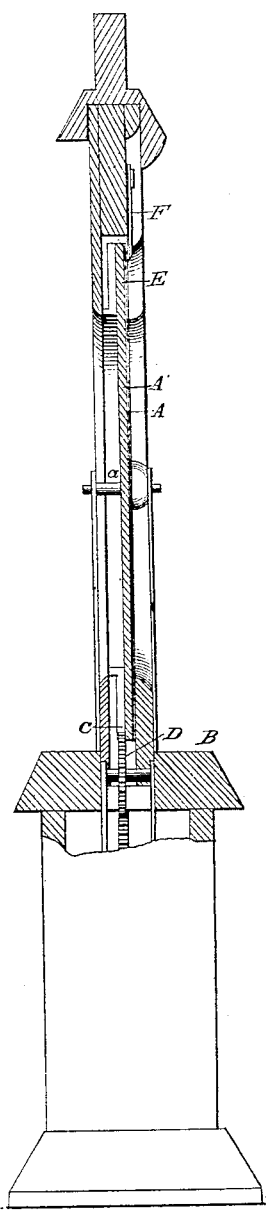
Witnesses:
Inventor:

United States Patent Office.

THEODORE R. TIMBY, OF SARATOGA SPRINGS, NEW YORK.

IMPROVEMENT IN SOLAR TIME-PIECES.

Specification forming part of Letters Patent No. 40,519, dated November 3, 1863.

*To all whom it may concern:*

Be it known that I, THEODORE R. TIMBY, of Saratoga Springs, in the county of Saratoga and State of New York, have invented a new and Improved Solar Time-Piece; and I do hereby declare that the following is a full, clear, and exact description of the same, reference being had to the accompanying drawings, making a part of this specification, in which—

Figure 1 represents a front elevation or face view of my invention, partly in section. Fig. 2 is a transverse vertical section of the same.

Similar letters of reference in both figures indicate corresponding parts.

This invention consists in the arrangement of a revolving dial, in combination with a map representing a polar projection of one of the hemispheres and with a stationary index, in such a manner that the culminating time of the sun on any part of the globe, and also the difference of time between different localities, can be observed with ease and facility.

To enable others skilled in the art to make and use my invention, I will proceed to describe it.

A is a map representing a polar projection of the Northern or Southern hemisphere of the globe. This map is secured by paste or glue to the center of a disk, A', which rotates on an axis, *a*, that has its bearings in two brackets, *b*. These brackets are attached to a case, B, made of wood or any other suitable material, in the shape of a clock-case of any desirable pattern, and to the circumference of the disk A' a toothed ring, C, is firmly fastened by means of screws or in any other desirable manner. This ring gears into a cog-wheel, D, to which motion is imparted by an ordinary clock-movement that is concealed in the lower part of the case B. The cog-wheel D and ring C are geared up so that said ring, with the disk A', makes one revolution in twenty-four hours. The ring A is somewhat smaller in diameter than the disk, leaving room for the dial E, which is divided into twenty-four equal parts to indicate the twenty-four hours of the day, and subdivided into suitable spaces to indicate parts of hours and minutes. It is marked with figures from 1 to 12, these figures being repeated twice to fill up the entire circle.

F is a stationary index, which is secured to the face of the case B over the disk A', and pointing in the direction of its center or of the pole. The map is so adjusted under the index that the meridian of that place in which the clock is to be used is exactly under the point of the index at twelve o'clock at noon. As the disk revolves by the action of the clock movement, the meridians of the hemispherical may, and also the different marks on the dial, pass successively under the point of the index, and by the position of the index in relation to the different meridians the time of culmination of the sun for the different localities in said hemisphere is indicated, and at the same time by the position of the index in relation to the marks on the dial the time of the day at the place of observation can be seen at a glance.

It is obvious that when the clock is to be taken from one place to another under a different meridian the map A has to be shifted to correspond to the new position.

What I claim as new, and desire to secure by Letters Patent, is—

1. A revolving hemispherical map, A, in combination with a stationary index, F, substantially as and for the purpose specified.

2. A revolving clock-face or dial, E, in combination with the map A and stationary index F, constructed and operating in the manner and for the purpose substantially as set forth.

THEODORE R. TIMBY.

Witnesses:
 THOS. S. J. DOUGLAS,
 GEO. W. REED.